(12) United States Patent
Hartloff

(10) Patent No.: US 8,745,517 B2
(45) Date of Patent: Jun. 3, 2014

(54) VISUAL CHANGE CUE FOR COMMUNICATING MANUFACTURING ISSUES OF A CUSTOM PART

(75) Inventor: Matthew Hartloff, Plymouth, MN (US)

(73) Assignee: Proto Labs, Inc., Maple Plain, MN (US)

( * ) Notice: Subject to any disclaimer, the term of this patent is extended or adjusted under 35 U.S.C. 154(b) by 404 days.

(21) Appl. No.: 13/157,107

(22) Filed: Jun. 9, 2011

(65) Prior Publication Data

US 2012/0316667 A1 Dec. 13, 2012

(51) Int. Cl.
| | |
|---|---|
| G06F 3/048 | (2013.01) |
| G05B 15/00 | (2006.01) |
| G06F 19/00 | (2011.01) |
| G06T 17/00 | (2006.01) |
| G01N 21/00 | (2006.01) |
| G06K 9/00 | (2006.01) |

(52) U.S. Cl.
USPC ............. 715/767; 715/768; 715/771; 700/83; 700/98; 700/182; 345/420; 356/239.7; 382/154

(58) Field of Classification Search
USPC ......... 700/83, 95, 97, 98, 117, 159, 180, 182; 703/1; 715/764, 767, 768, 771, 772; 345/418–420, 441; 356/237.1, 239.1, 356/239.7; 382/100, 154
See application file for complete search history.

(56) References Cited

U.S. PATENT DOCUMENTS

| | | | |
|---|---|---|---|
| 5,987,469 A | 11/1999 | Lewis et al. | |
| 6,417,919 B1 * | 7/2002 | Hewitt et al. | ............... 356/237.1 |
| 6,675,055 B1 | 1/2004 | Fischer | |
| 6,701,200 B1 | 3/2004 | Lukis et al. | |
| 6,836,699 B2 | 12/2004 | Lukis et al. | |
| 6,920,414 B2 * | 7/2005 | Tøpholm | ........................ 703/1 |
| 6,975,909 B2 * | 12/2005 | Kluge et al. | .................... 700/83 |
| 7,089,082 B1 | 8/2006 | Lukis et al. | |
| 7,119,805 B2 * | 10/2006 | Batori et al. | .................. 345/419 |
| 7,123,986 B2 | 10/2006 | Lukis et al. | |
| 7,299,101 B2 | 11/2007 | Lukis et al. | |
| 7,496,528 B2 | 2/2009 | Lukis et al. | |
| 7,590,466 B2 | 9/2009 | Lukis et al. | |
| 7,630,783 B2 | 12/2009 | Walls-Manning et al. | |
| 7,836,573 B2 | 11/2010 | Lukis et al. | |
| 7,840,443 B2 | 11/2010 | Lukis et al. | |
| 7,957,830 B2 | 6/2011 | Lukis et al. | |
| 8,239,284 B2 * | 8/2012 | Lukis et al. | .................. 705/26.5 |
| 8,295,971 B2 * | 10/2012 | Krantz | .......................... 700/182 |
| 8,560,103 B2 * | 10/2013 | Kubli et al. | ..................... 700/97 |
| 2004/0120383 A1 * | 6/2004 | Kennedy et al. | ................ 374/57 |

(Continued)

OTHER PUBLICATIONS

"IRONCAD Getting Started Guide", 2005, IronCAD, http://www.ironcad.com/product/gettingstarted.pdf.

(Continued)

*Primary Examiner* — Crystal J Barnes-Bullock
(74) *Attorney, Agent, or Firm* — Shewchuk IP Services, LLC; Jeffrey D. Shewchuk

(57) ABSTRACT

Any issues associated with manufacture of a part are identified and highlighted on a part rendering. A software method and system then uses a visual change cue on the part rendering for communicating the manufacturability issues to the customer. The preferred visual change cue is a throbbing of the highlighting of the manufacturability issue, with the throbbing occurring in both color intensity and size. The part rendering depicts the part translucently, so throbbing manufacturability issues can be readily identified even if obscured behind a more-forward face of the part.

19 Claims, 6 Drawing Sheets

(56) References Cited

U.S. PATENT DOCUMENTS

| | | | |
|---|---|---|---|
| 2004/0221258 A1* | 11/2004 | Devore et al. | 717/102 |
| 2006/0173566 A1* | 8/2006 | Walls-Manning et al. | 700/98 |
| 2007/0206030 A1 | 9/2007 | Lukis | |

OTHER PUBLICATIONS

"3DCaliper", RAND Worldwide, 2003, http://products.engineering.com/uploads/p01386__3DC__v20__TechBrief__dec__11__2003__Rand__screen.pdf.

Day, Martyn, AutoVue A foundation for view, markup and collaboration, Cimmetry Systems, Inc., http://www.cinnmetry.com/whitepapers/AutoVue__a__Foundation__for__View__Markup__and__Co.

Wu, Shin-Ting et al., Interactive 3D Geometric Modelers with 2D UI, 2002, State University of Campinas, www.dca.fee.unicamp.br, Sao Paulo, Brazil.

Bade, Ragnar et al., Usability Comparison of Mouse-based Interaction Techniques for Predicatable 3d Rotation, Aug. 2005, http://ifgi.uni-muenster.de/.about.kruegera/sg05/135.pdf/.

* cited by examiner

VISUAL CHANGE CUE FOR COMMUNICATING MANUFACTURING ISSUES OF A CUSTOM PART

CROSS-REFERENCE TO RELATED APPLICATION(S)

None.

BACKGROUND OF THE INVENTION

The present invention relates to software supported methods, systems and tools used in the design and fabrication of custom parts, and in presenting information to customers for the customer to make selections or changes to help minimize the cost of manufacturing the customer's part.

Injection molding, among other types of molding techniques, is commonly utilized to produce plastic parts from molds. Companies and individuals engaged in fabricating molds are commonly referred to as "moldmakers." The moldmaking art has a long history of fairly gradual innovation and advancement. Molds are designed pursuant to a specification of the part geometry provided by a customer; in many cases, functional aspects of the plastic part also need to be taken into account. Historically, moldmaking involves at least one face-to-face meeting between the moldmaker and the customer, with complex communication between the moldmaker and the customer and complex decisions made by the moldmaker regarding the construct of the mold. More recently, this process has been automated to a significant degree, to assist in transmitting information between the moldmaker and/or the moldmaker's computer system and the customer, thereby realizing significant efficiencies and corresponding price reductions in the manufacture of molds and custom molded parts. Other manufacturing processes, such as machining of a part, have also been significantly automated including transmission of information regarding the part to be manufactured. Such automation is described in U.S. Pat. Nos. 7,957,830, 7,840,443, 7,836,573, 7,630,783, 7,590,466, 7,496,528, 7,299,101, 7,123,986, 7,089,082, 6,836,699 and 6,701,200, all assigned to the assignee of the present invention and all incorporated by reference.

While this automation has greatly improved the process of identifying manufacturability issues, communicating those issues to the customer and quoting manufacture of the mold and/or part, problems still remain. One particular remaining problem is a difficulty of customers in quickly understanding where on a part a particular problem or needed change is located. With the face-to-face meetings between the moldmaker and the customer of the prior art, customers and moldmakers could work through the communication issues with pointing or similar gestures, on-the-fly sketches, and give-and-take dialogue characteristic of face-to-face communication. To automate the process so no moldmaker-customer face-to-face meeting is necessary, clear communication is vitally important. Sometimes the identified problem or needed manufacturability change is on a small detail of the part. Sometimes the manufacturability change is only seen on one side of the part.

The invention of U.S. Pat. No. 7,299,101 in particular, which disclosed a programmed flight pattern to show various issues to the customer, made great strides in communicating such manufacturability issues to the customer. Still, some customers are more comfortable and understand issues better when they manipulate the part rendering on the screen themselves rather than viewing the programmed flight pattern. While the programmed flight pattern may proceed too quickly for some customers, other more experienced customers may consider the programmed flight pattern tedious in proceeding through viewing all the issues on a particular part. Faster and clearer methods of communication between the part maker and the customer are needed. The need for communication clarity increases as the variety of parts manufactured through automated methods becomes more and more complex. The clearer methods of communication should permit transmission via computer and without real-time face-to-face personal interaction.

BRIEF SUMMARY OF THE INVENTION

The present invention is a software method and system for communicating manufacturability issues. The customer's CAD file for the part is received and assessed for compliance with constraints of the manufacturing method for making the part. Preferably as an integral portion of the quotation returned to the customer, a computer rendering of the part is provided which graphically identifies the manufacturability issues. Sections without a particular manufacturability issue are shown translucently relative to at least one section identified as having that manufacturability issue such that the section having that manufacturability issue can be viewed through a more-forward face of the part. The section(s) identified as having that manufacturability issue is (are) depicted with a visual change cue, such as a throbbing effect, which enables the customer to immediately identify the locations on the part having the issue.

BRIEF DESCRIPTION OF THE DRAWINGS

FIGS. 2-4 show a computer screen with a quotation communicating mold/part manufacturability issues in a web browser accordance with a preferred embodiment of the present invention.

While the above-identified drawing figures set forth one or more preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

Figure 1:
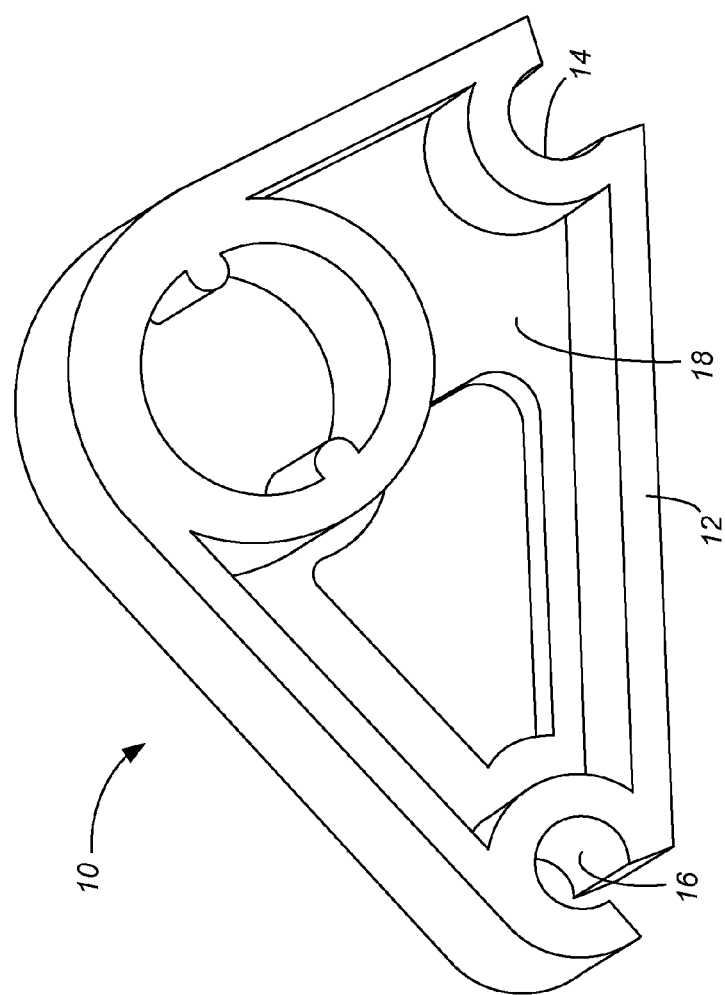
FIG. 1 is a perspective view of an exemplary "cam" part desired by a first customer.

FIG. 1 shows an exemplary part 10 for discussion purposes of the inventive way to communicate issues associated with the manufacture of that part 10. In this example, the part 10 is a "cam" part custom designed by a customer named John One. In part because the cam 10 is custom-designed (i.e., not a staple article of commerce) by or for this particular customer, the cam 10 includes numerous features, none of which have commonly accepted names. For purposes of discussion, we will give names to several of these features, including a part outline flange 12, a 60° corner hole 14, a 30° corner hole 16 and a partial web 18. However, workers skilled in the art will appreciate that the customer may in fact have no name or may have a very different name for any of these features. Without commonly accepted names for these features, verbal communication about changes to one or more features of the cam part 10 is difficult. The present invention is particularly contemplated as a better way to communicate changes or injection molding requirements or machining requirements of the part 10.

The quoting of the mold and/or manufacture for the part 10 may generally proceed with automated systems and methods such as described in U.S. Pat. Nos. 7,957,830, 7,840,443, 7,836,573, 7,630,783, 7,590,466, 7,496,528, 7,299,101, 7,123,986, 7,089,082, 6,836,699 and 6,701,200, all incorporated by reference herein. In procedure explained in these patents, a basic step is receiving customer part data comprising a CAD file for the part 10 to be molded or machined, with the CAD file defining a part surface profile. The part 10 is custom designed by or for the customer, and its shape is unknown at the time the computer system housing the invention and software of the invention is finalized.

While the software analysis of the customer's CAD file may be a stand-alone feature offered on a website or provided in other ways to the customer, in this example the context of receiving the customer's CAD file is that John One requested a quote, i.e., John One is interested in learning how much it would cost to injection mold (or machine) twenty-five cams 10 for testing. John One provided his CAD file and filled out various menu fields associated with the requested quotation. Analysis of the part 10 is conducted, and a quotation is returned to John One, either by email, by a website, or by another computer supported method which allows viewing of graphical information regarding the quotation on a computer or similar screen.

Figure 2:
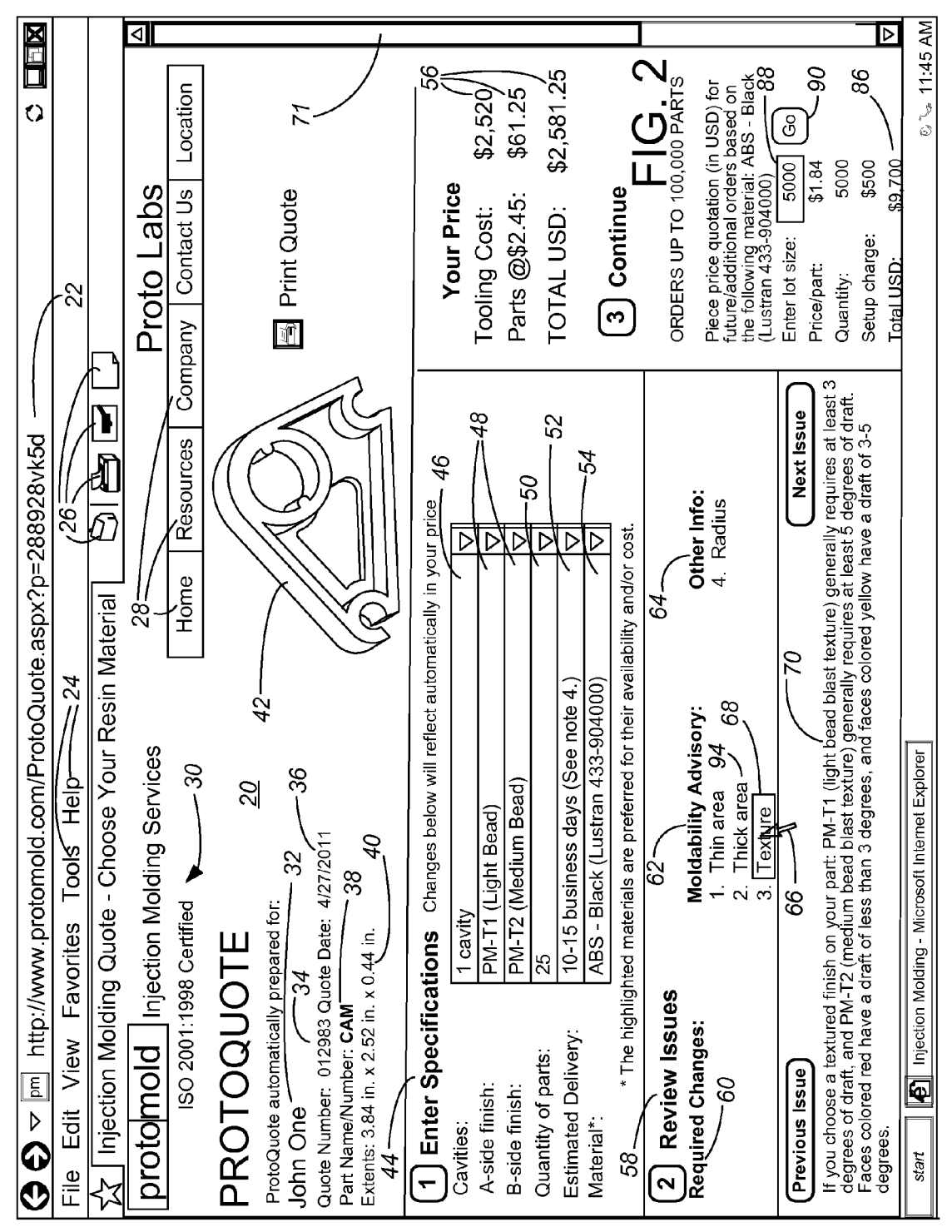

A preferred format for the quotation 20 is shown in FIG. 2. In this case, the quotation 20 is provided through an internet browser (such as MICROSOFT'S INTERNET EXPLORER), which permits an address bar 22, active fields 24 and buttons 26 on the computer screen and active links 28 on the page as well known in internet browser and website construction. The quotation 20 includes identifying information for the quotation 20, including the source 30 of the quotation 20, the customer's name 32, the quote number 34 and quotation date 36, the customer's part name 38, and the x-, y- and z-extents 40 of the part 10 either in English or metric units. An image 42 of the part 10 is also shown.

The preferred quotation 20 includes a first "Enter Specifications" section 44 providing several menu fields which are initially populated with information entered by the customer on the original quote form (at the time the CAD file was provided), but which permit the customer to enter changes for instantaneous and automatic feedback on how the changes affect the quotation price. This information preferably includes how many cavities 46 will be included on the mold block, surface finishes 48 on the A-side and B-side of the mold, how many samples 50 are desired, the delivery time 52 in which the samples are needed, and the material 54 which will be used in injection molding the part 10. Pricing information 56 for the part 10 is provided to the customer as part of the quote 20.

In this example, the software analysis of the customer's CAD file has identified several issues associated with manufacture of the cam part 10. For instance, if the manufacture of the part 10 is through injection molding, the CAD file can be assessed for compliance with constraints of injection molding, and the identified manufacturability issues are various failures to meet geometry criteria of an injection molding process. If the manufacture of the part 10 is through machining a block of workpiece material, the CAD file can be assessed for compliance with constraints of machining. The identified issues are explained to the customer in a "Review Issues" section 58 of the quote 20. In this example, the analysis of the customer's CAD file has identified no "Required Changes" issues 60 which require significant changes to the part shape, but has identified three "Moldability Advisory" issues 62 which do not require changes to the part shape but are alerts as to possible molding difficulties, and one item of other information 64 of which the customer should be advised. Rather than have to step through these issues 60, 62, 64 in any particular order, the customer can use a mouse pointer 66 to click on the issue which the customer desires to view. In this example, the customer has clicked on the "Texture" Moldability Advisory issue 68. In addition to the top section listing the "Required Changes" 60, "Moldability Advisory" 62 and "Other Info" issues 64, the Review Issues pane 58 includes a textual explanation 70 of whichever issue is being considered, i.e., of whichever issue the customer has clicked on.

Figure 3:
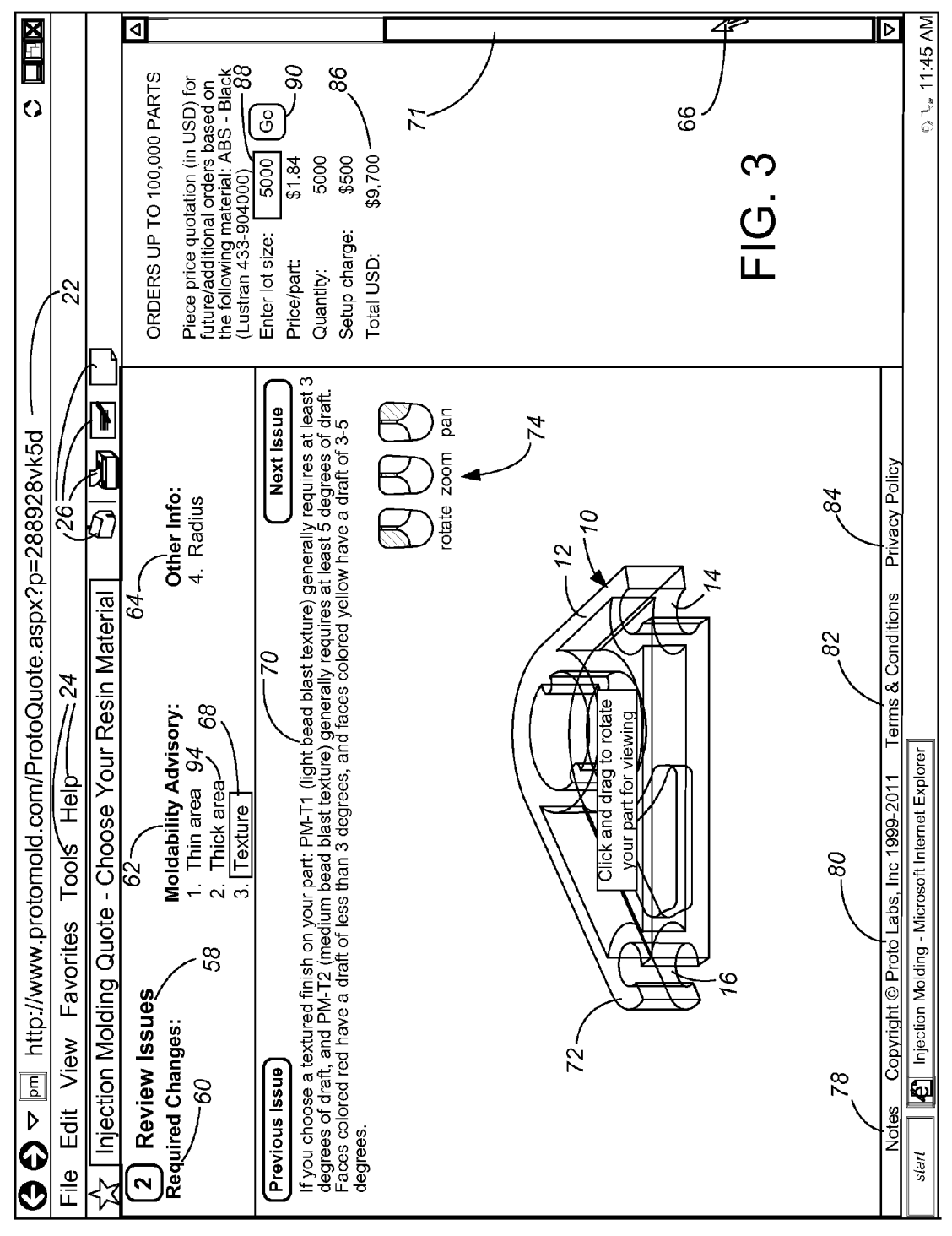
Figure 4:
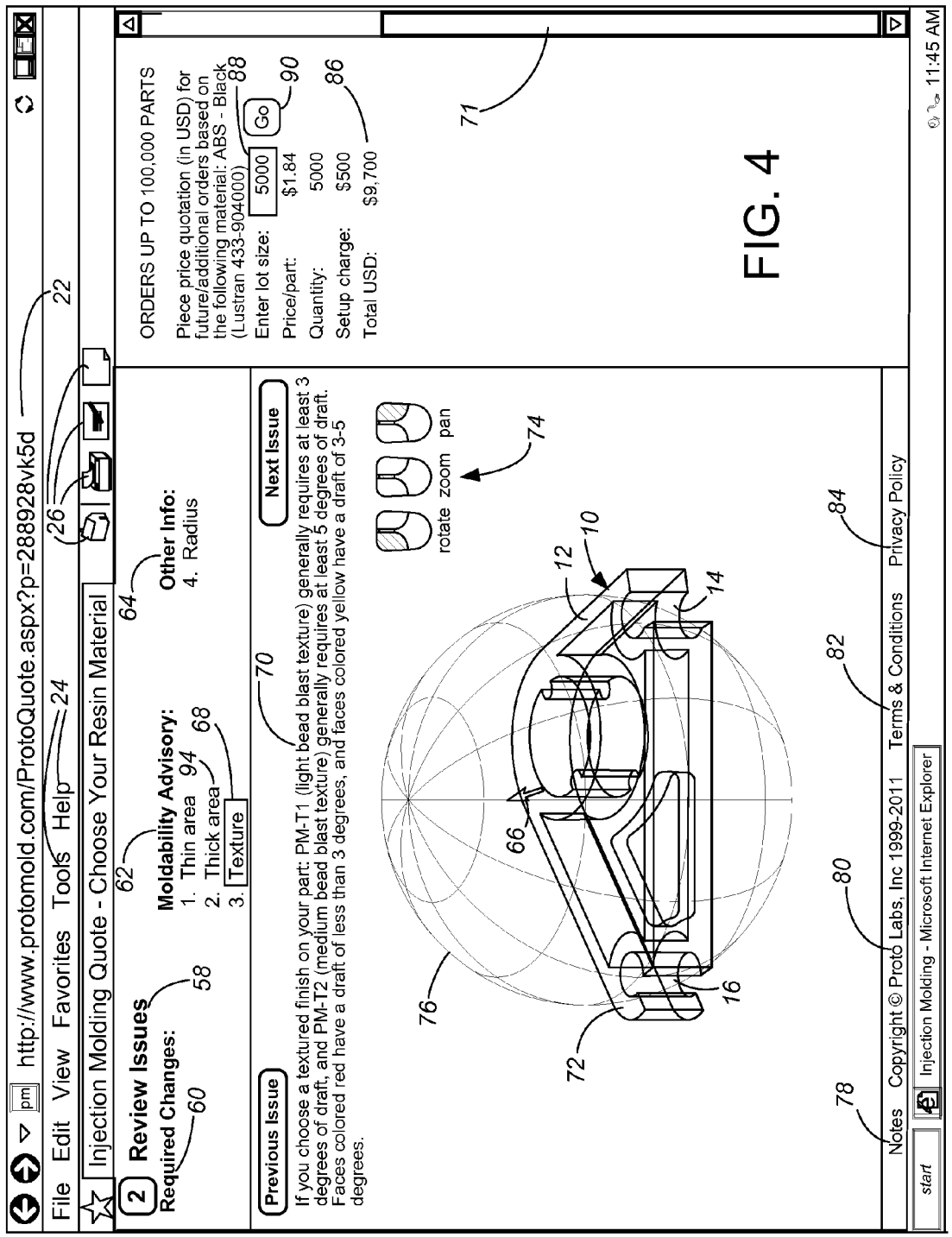

The customer can scroll downward in the quote 20, such as by using a scroll bar 71 as further shown in FIG. 3, to view additional information in the Review Issues pane 58 in the quote 20. Beneath the textual explanation 70, a rendering 72 of the part 10 is provided. The preferred part rendering 72 is manipulatable by the user by using the computer mouse 66 to rotate the part 10, zoom the part 10 and pan the part 10, as indicated by a mouse control key 74. As indicated in FIG. 4, the preferred manipulation algorithm includes the orientation globe 76 as taught in U.S. Patent Pub. No. 2007/0206030, incorporated by reference. A lower section of the quote 20 may include other information, such as a Notes section 78, a copyright notice 80, a Terms & Conditions section 82, and/or a Privacy Policy link 84. Another section of the quote 20 may include prices for future/additional orders 86, such as based upon any entered lot size 88 and updatable with a "Go" button 90.

Figure 5:
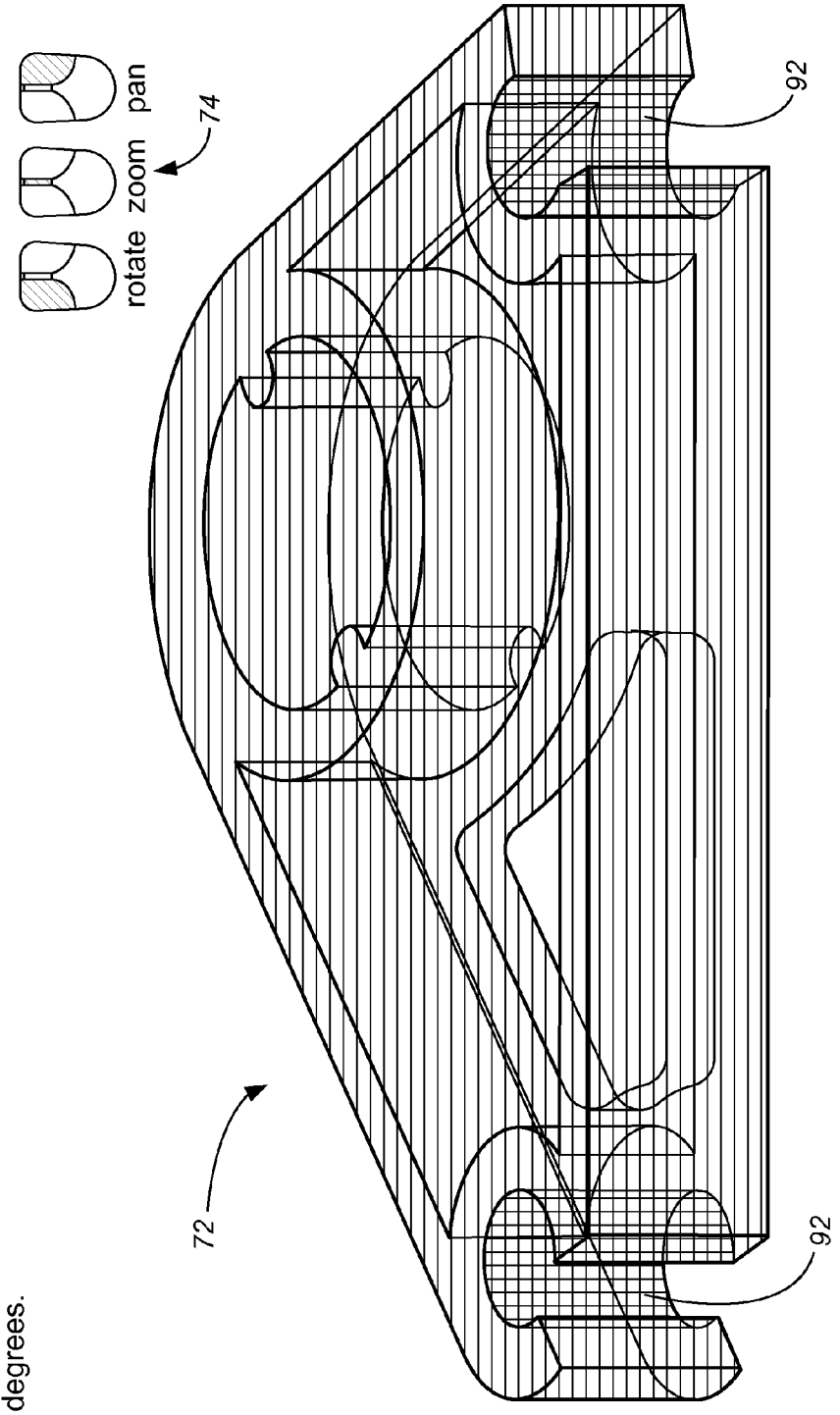
FIGS. 5 and 6 show an enlargement of a portion of the quote of FIGS. 3 and 4, timed about $⅝^{th}$ of a second apart.
Figure 6:
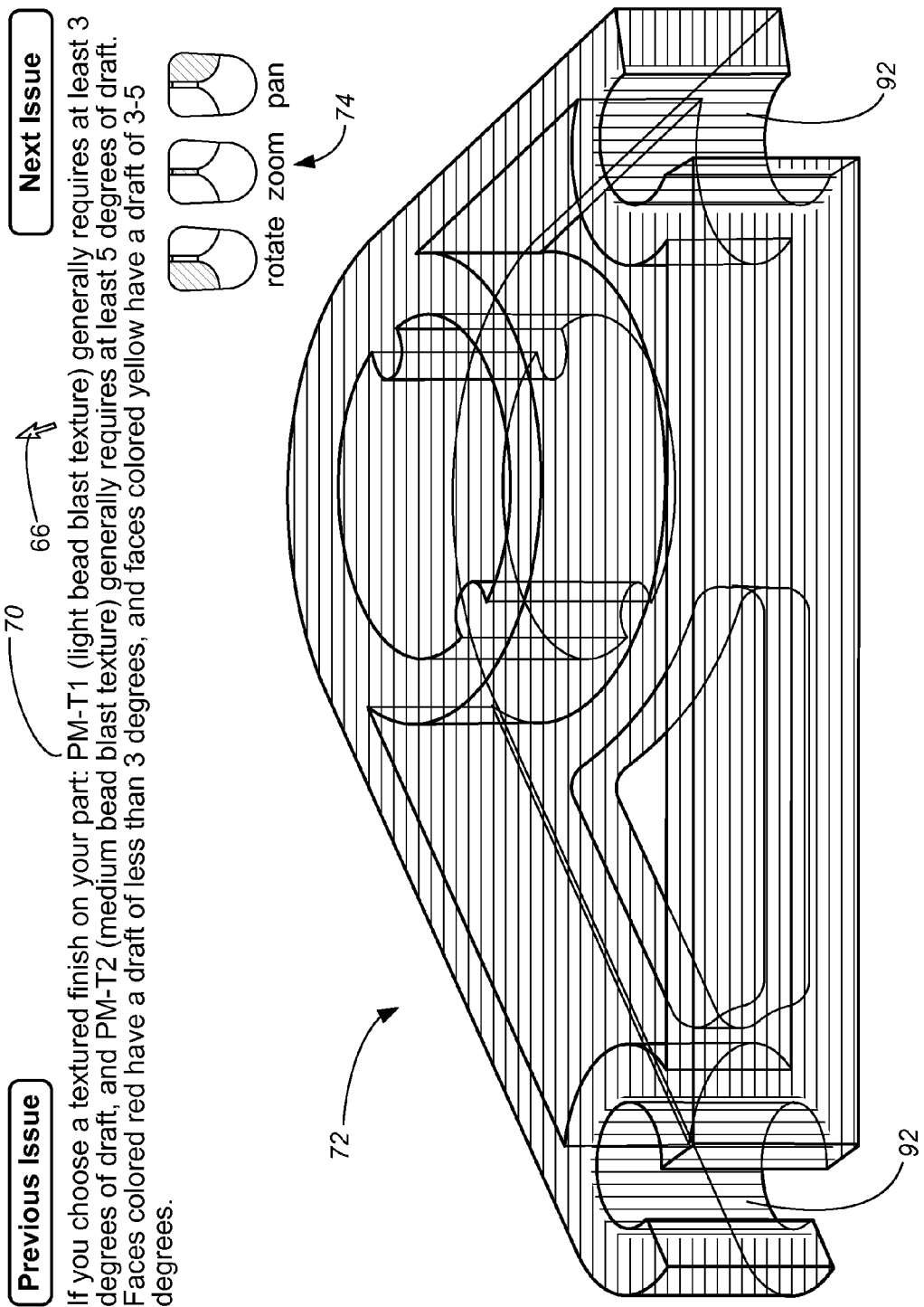

In Applicant's prior art system such as described in U.S. Pat. No. 7,299,101, the information was communicated using an opaque image which showed the locations of failure highlighted with color or otherwise identified so the customer would see where the changes were needed. In contrast to the prior art part rendering, the part rendering 72 now is translucent. The translucent coloring is omitted from FIGS. 3 and 4 for clarity, but is better shown in enlarged view of FIGS. 5 and 6. In this case the customer zoomed on the part 10 somewhat, enlarging the size of the part 10 relative to the textual information 70 and the mouse control key 74 (and the orientation globe 76, not shown), in addition to the fact that FIGS. 5 and 6 are enlarged to only show a portion of the Review Issues pane 58.

The faces 92 where the issue exists are colored with a different color than the faces where no issue exists. In this example when the issue is draft associated with texture, faces with a draft of less than 3 degrees are colored red and faces with a draft of 3-5 degrees are colored yellow. For the example of this cam part 10, the 60° corner hole 14 and the 30° corner hole 16 do not have the recommended draft for the texture being used, and are shown in opaque red coloring 92. Particularly given that there are no known names for the 60° corner hole 14 and the 30° corner hole 14 at the time the quote 20 is transmitted, it would be nearly impossible to communicate these failures to the customer, in a way that the customer would quickly understand and appreciate how to make changes to the part 10 to correct the failures, using strictly verbal communication. Translucency of the part rendering 72 (other than the issue coloring 92) is particular important for features such as the 60° corner hole 14 and the 30° corner hole 16, which features are not shown in all viewing angles of the part 10. If the customer rotated the part rendering 72 180° about the Z-axis, for instance, the red-colored surfaces 92 would not be visible on an entirely opaque rendering of the part 10. Because the rendering 72 in the Review Issues pane 58 is translucent, however, red coloring 92 can be seen through the most forward face(s) of the part 10 (in this case, through the part outline flange 12), even when the most forward face(s) don't have the same manufacturability issue. If desired, the issue coloring could also be translucent (i.e., translucent red and yellow), but the preferred embodiment provides opaque issue coloring.

In the preferred embodiment, the translucency is provided by shading each of the external surfaces of the part rendering 72 with a set amount of transpency, while leaving the interior of the part 10 entirely transparent. In this way, the translucency coloring of the part 10 is independent of how thick the part 10 is at any given location, and dependent solely on how many faces overlap in that particular viewing angle of the part 10. For example, each face may be rendered with a transparency of from 50% to 95%, such as preferred a transparency of about 80 or 85% per face. For the cam part 10 at the 0° slant, 30° tilt orientation shown, there are some portions with two overlapping faces (i.e., a line of sight from the viewing angle passes through the part 10 a single time), some portions with four overlapping faces (i.e., where a line of sight from the viewing angle passes through the part 10 twice, such as through both the part outline flange 12 and the partial web 18), and a few portions with six overlapping faces (i.e., where a line of sight from the viewing angle passes through the part 10 three times). If desired, the translucency coloring can be set based upon which side of the mold forms that face. In one preferred embodiment (not shown in FIGS. 5 and 6), faces formed by the A side of the mold are colored translucent green, while faces formed by the B side of the mold are colored translucent blue. Additionally, while FIGS. 3-6 are line drawings showing lines on the part rendering 72 at edges, the inclusion of lines-at-edges on the rendering 72 of the part 10 is optional, i.e., if desired the image of the part 10 can be provided solely by the colored translucent faces without any opaque or darker lines at the edges.

In the preferred embodiment, the coloring 92 of each issue is only shown when that particular issue is clicked by the customer. In this preferred example, the coloring for the "Thin area" issue, the "Thick area" issue and the "Radius" issue is different from the red and yellow coloring of the "Texture" issue, such as using bright green, dark blue and magenta for those issues. When the customer clicks on the "Thick area" issue 94 (shown in FIGS. 2-4), for instance, the text 70 changes to describe the thick area issue (describing possible sink marks), the red and yellow coloring 92 disappears from the part rendering 72, and dark blue coloring appears in the locations having the thick area issue. If desired, the same colors can be used for different issues which do not show up at the same time. Alternatively, multiple issues can be presented on the part 10 at the same time, each issue using different color(s).

In Applicant's prior art system of U.S. Pat. No. 7,299,101, the customer was shown each issue by using a programmed flight pattern to automatically manipulate the part 10 so the customer could see the next issue. The present invention can be used with or without the programmed flight pattern, but is intended to further empower the customer to self-manipulate the part 10 when viewing a particular issue. The present invention, beyond providing a part rendering 72 which is translucent rather than opaque, also adds a visual change cue to the manufacturability issue. The visual change cue changes as a function of time, at a rate fast enough to be identified by the viewer, by itself and without requiring manipulation of the part rendering 72.

In the preferred embodiment, the visual change cue is a throbbing of the coloring, transparency or intensity of the manufacturability issue shown by a comparison between FIGS. 5 and 6. The difference between FIGS. 5 and 6 is that the red coloring 92 of the texture issue throbs relative to the static blue (and green) coloring of the other part faces. For instance, the intensity, hue and/or shade of the red coloring 92 in the preferred embodiment changes (growing brighter and dimmer) with a period of about 1¼ seconds, i.e., the part rendering 72 changes from FIG. 5 to FIG. 6 in about ⅝$^{th}$ of a second, and then changes back to FIG. 5 in another ⅝$^{th}$ of a second, alternating in a continuing succession.

To further create the throbbing effect, one preferred visual change cue includes a slight spreading of the more intense color 92 on the surface of the part 10. The size of the issue coloring 92 spreads and shrinks on the surface of the part 10 with the spreading/shrinking timing corresponding to brightening/dimming timing.

One preferred and commented code to produce this throbbing effect according to a relatively simple animation of the rendering 72 is shown below:

```
const int ANIMATION_START_MS = 200;        // where to start so it
appears smooth
const int ANIMATION_LENGTH_MS = 1250;      // total length of animation
(1.25 sec)
const int MIN_VALUE = 0.5;                 // min value produced
const int MAX_VALUE = 1.0;                 // max value produced
// this will produce a percentage between 0 and 1
int total_ms_elapsed = m_glow_time.elapsed( );
int ms_in_animation = (total_ms_elapsed + ANIMATION_START_MS) %
ANIMATION_LENGTH_MS;
double perc_in_animation = (double)ms_in_animation / (double)CYCLE_TIME;
// produce a symmetrical animation
if (perc_in_animation >= 0.5)
    perc_in_animation = 0.5 - (perc_in_animation - 0.5f);
perc_in_animation *= 2.0;         // return range to 0-1 (from 0 - 0.5)
// will produce a value between 0.5 and 1.0. 0 = 0.5, 1.0 = 1.0
double emission_val = (perc_in_animation * (MAX_FACTOR - MIN_FACTOR) +
MIN_FACTOR;
//// SEPERATE FUNCTION where the colors are derived and rendered
// multiply the color by the emission value. An emission of 1 would produce the start
color, 0 would produce black
PvColor new_color = old_color * emission_val;
// blend a bit with white in relation to the strength of the emission. In this way
```

-continued

```
// we can get a larger spread of color as well as get even blacks to glow
new_color.blend(PvColor::WHITE, emission_val / 2.5);
// the opengl call
glColor4ubv(new_color);
```

This code results in a throbbing color value, with varying emission values and varying additional amounts of white blended in as a function of time.

In the preferred embodiment, the throbbing effect of each issue is only shown when that particular issue is clicked by the customer, even if multiple issues are presented on the part 10 at the same time using different color(s). In this preferred example, only the "Texture" area throbs; the "Thin area", the "Thick area" and the "Radius" area throb only when the customer clicks on the headings for those issues.

The throbbing function has been found to be immediately recognizable to viewers for identifying the surface(s) 92 of the part 10 having the manufacturability issue, even when the location of the issue is very small and even when the face having the manufacturability issue would not been seen at a given viewing angle on an opaque rendering. Once the customer sees the throbbing 92, the customer can then self-manipulate the part rendering 72 in rotate, zoom or pan to better view the issue, and the throbbing 92 continues throughout and after the rotate/zoom/pan manipulation. Alternatively, the customer may be able to immediately—without manipulation—identify the location on the part 10 having the manufacturability issue and requiring change.

The visual change cue works so effectively to communicate the location of the manufacturability issue because the viewer's eye is so attuned to detecting motion or change in the viewed image. Because humans are so adept at motion perception, they can immediately locate the throbbing location on the part 10 even when the location is small and/or behind other surfaces. It is noted that many types of visual change cues other than throbbing, such as a flashing, color shade changes or a slight movement of the colored locations on the part 10, could alternatively and effectively serve to immediately communicate the location of the manufacturability issue to the viewer. The key concept for the visual change cue is that, even when the part rendering 72 is not being moved or manipulated but rather is being viewed at a stationary viewing angle, something about the identified manufacturability issue changes as a function of time so as to be perceived by the motion perception abilities of the average viewer. The visual change cue, particularly when coupled with the translucency of the part rendering 72, permits communication to occur as quickly as possible, and fully allows the user to select the rate and order at which different issues are viewed.

Although the present invention has been described with reference to preferred embodiments, workers skilled in the art will recognize that changes may be made in form and detail without departing from the spirit and scope of the invention.

The invention claimed is:

1. A method for communicating issues associated with manufacture of a part, comprising:
   receiving customer part data comprising a CAD file for the part, the CAD file defining a part surface profile;
   assessing the CAD file for compliance with constraints of a manufacturing method for making the part, the assessing act identifying sections of the part surface profile which have manufacturability issues; and
   providing the customer with a computer rendering of the part, wherein sections without a particular manufacturability issue are shown translucently relative to at least one section identified as having that manufacturability issue such that the section having that manufacturability issue can be viewed through a more-forward face of the part, and wherein the at least one section identified as having that manufacturability issue is depicted with a visual change cue which changes as a function of time to relative to sections without that manufacturability issue.

2. The method of claim 1, wherein the sections without that manufacturability issue are shown stationary.

3. The method of claim 2, wherein the visual change cue is a throbbing of color intensity of the section identified as having that manufacturability issue.

4. The method of claim 3, wherein the visual change cue further comprises a throbbing of the size of area on the part surface profile depicted as having the manufacturability issue.

5. The method of claim 2, wherein the visual change cue is a change of color of the section identified as having that manufacturability issue.

6. The method of claim 2, wherein the visual change cue is a flashing of the section identified as having that manufacturability issue.

7. The method of claim 2, wherein the computer rendering is manipulatable on a computer screen by the customer in zoom, angle or pan so the customer can better locate the sections having identified manufacturability issues on the part surface profile.

8. The method of claim 7, wherein the computer rendering is manipulatable in zoom, angle and/or pan by a user using a "click-drag-drop" command of a computer mouse.

9. The method of claim 1, wherein the sections without a particular manufacturability issue are shown translucently at a value which is independent of the thickness of the part at the location and angle that the part is depicted.

10. The method of claim 1, wherein the manufacture of the part is through injection molding, wherein the CAD file is assessed for compliance with constraints of injection molding, and wherein the identified manufacturability issue is failure to meet a geometry criterion of an injection molding process.

11. The method of claim 1, wherein the manufacture of the part is through machining a block of workpiece material, wherein the CAD file is assessed for compliance with constraints of machining.

12. The method of claim 1, further comprising:
   providing the customer with a quotation for manufacture of one or more parts and/or a mold for the part conforming in shape to the part surface profile at locations other than the sections having required change manufacturability issues.

13. The method of claim 12, wherein the computer rendering of the part is within the quotation.

14. The method of claim 12, and further comprising injection molding the part upon customer acceptance of the quotation.

15. The method of claim 12, and further comprising machining the part upon customer acceptance of the quotation.

16. The method of claim 1, wherein a textual explanation of the manufacturability issue is provided with the computer rendering of the part.

17. The method of claim 1, wherein multiple manufacturability issues are identified each at different sections of the part surface profile, wherein the computer rendering allows the customer to select and depict any one of the multiple manufacturability issues with the visual change cue while the non-selected manufacturability issues are not depicted with the visual change cue.

18. A method for communicating issues associated with manufacture of a part, comprising:
    receiving customer part data comprising a CAD file for the part, the CAD file defining a part surface profile;
    assessing the CAD file for compliance with constraints of a manufacturing method for making the part, the assessing act identifying sections of the part surface profile which have manufacturability issues; and
    providing the customer with a computer rendering of the part, wherein at least one section identified as having the manufacturability issue is depicted with a visual change cue which changes as a function of time to relative to sections without that manufacturability issue, wherein the visual change cue comprises:
        a throbbing of color of the section identified as having that manufacturability issue; and
        a throbbing of the size of area on the part surface profile depicted as having the manufacturability issue.

19. A rendering of a custom part for communicating manufacturability issues to a customer, comprising:
    a computer readable medium storing
        a rendering of a part surface profile of the custom part which highlights sections having identified manufacturability issues, wherein sections without identified manufacturability issues are translucent such that at least one section having that manufacturability issue can be viewed through a more-forward face of the part; and
        computer instructions for depicting the at least one section identified as having that manufacturability issue with a visual change cue which changes as a function of time to relative to sections without that manufacturability issue.

\* \* \* \* \*